(12) United States Patent
Sawashima (10) Patent No.: US 10,654,671 B2
(45) Date of Patent: May 19, 2020

(54) SHEET CONVEYING APPARATUS AND IMAGE FORMING APPARATUS

(71) Applicant: CANON KABUSHIKI KAISHA, Tokyo (JP)

(72) Inventor: Fumiya Sawashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/030,611

(22) Filed: Jul. 9, 2018

(65) Prior Publication Data

US 2019/0031456 A1    Jan. 31, 2019

(30) Foreign Application Priority Data

Jul. 31, 2017 (JP) ................................ 2017-147663

(51) Int. Cl.
    *B65H 3/06*      (2006.01)
    *F16D 43/202*    (2006.01)

(52) U.S. Cl.
    CPC ......... *B65H 3/0669* (2013.01); *B65H 3/0684* (2013.01); *F16D 43/202* (2013.01); *B65H 2403/40* (2013.01); *B65H 2403/45* (2013.01); *B65H 2403/73* (2013.01)

(58) Field of Classification Search
    CPC .............. B65H 3/0669; B65H 2403/45; B65H 2403/73; B65H 2403/731; B65H 2403/732; B65H 2403/733; B65H 3/0684
See application file for complete search history.

(56) References Cited

U.S. PATENT DOCUMENTS

| | | | | |
|---|---|---|---|---|
| 8,276,474 B2* | 10/2012 | Kim | ..................... | G03G 15/757 74/10.39 |
| 8,366,097 B2* | 2/2013 | Tu | ........................ | B65H 3/0669 271/10.13 |
| 9,354,560 B2* | 5/2016 | Imaizumi | ........... | G03G 21/1647 |
| 10,124,974 B1* | 11/2018 | Kurita | ...................... | B65H 3/66 |
| 2002/0101025 A1* | 8/2002 | Lee | ........................ | B65H 3/063 271/10.11 |
| 2015/0329302 A1* | 11/2015 | Hayashi | .................. | B65H 1/04 271/117 |

FOREIGN PATENT DOCUMENTS

| | | |
|---|---|---|
| JP | 7-225538 A | 8/1995 |
| JP | 8-54027 A | 2/1996 |
| JP | 2011174586 A | 9/2011 |
| JP | 2015113192 A | 6/2015 |

* cited by examiner

*Primary Examiner* — Jeremy R Severson
(74) *Attorney, Agent, or Firm* — Canon U.S.A., Inc. IP Division (57) ABSTRACT

A sheet conveying apparatus includes a rotating member to covey a sheet and a drive transmission having a first, gear in a first engaging portion, a second gear in a second engaging portion, and an urging member. In a state where the first engaging portion and the second engaging portion are engaged with each other and the first gear is rotating in a first direction, a first surface of the first engaging portion transmits a driving force of a driving source from the first gear to the second gear. The first surface is inclined so that either engaging portion can retract, in the direction against the urging force of the urging member, to disengage with the other engaging portion while the first engaging portion rotates. A direction of twist of helical teeth in the first gear is configured to generate an axial force with respect to the urging direction.

13 Claims, 9 Drawing Sheets

SHEET CONVEYING APPARATUS AND IMAGE FORMING APPARATUS

BACKGROUND OF THE INVENTION

Field of the Invention

The present disclosure relates to a sheet conveying apparatus that conveys a sheet and an image forming apparatus including the sheet conveying apparatus.

Description of the Related Art

Conventionally, as an image forming apparatus such as an electrophotographic method, a configuration that has a sheet conveying apparatus for conveying a sheet stored in a sheet feeding cassette to an image forming unit and forms an image on the sheet conveyed by the sheet conveying apparatus is widely known. Such a sheet conveying apparatus is provided with a feeding roller as a rotating member that rotates by driving force transmitted from a driving source and picks up a sheet stored in the sheet feeding cassette and feeds the sheet to the image forming unit.

Japanese Patent Laid-Open No. 2011-174586 discloses a configuration in which drive is transmitted to a feeding roller by a driving mechanism having a ratchet mechanism to feed a sheet stored in a sheet feeding cassette. In such a configuration, while the sheet is fed toward the image forming unit, a state where gears transmitting the driving force from the driving source to the feeding roller mesh with each other is maintained, so that the feeding roller continues to rotate.

However, in the configuration of Japanese Patent Laid-Open No. 2011-174586, even when the load between the sheet fed toward the image forming unit and the feeding roller increases during the feeding operation, the state where the gears transmitting the driving force mesh with each other is maintained, and therefore the following issues occur. That is, in order to eliminate the load generated between the feeding roller and the sheet, the driving source attempts to transmit excessive driving force toward the feeding roller, which may result in deformation of the gears.

SUMMARY OF THE INVENTION

Accordingly, the present disclosure provides a sheet conveying apparatus or an image forming apparatus capable of releasing the transmission of driving force from a driving source before excessive driving force is transmitted from a driving source to a rotating member.

According to an aspect of the present invention, a sheet conveying apparatus includes a rotating member configured to come into contact with a sheet and convey the sheet in a sheet conveying direction by rotating, and a drive transmission unit including a first gear provided with a first engaging portion, a second gear provided with a second engaging portion configured to engage with the first engaging portion, and an urging member configured to urge the first gear toward the second gear, and the drive transmission unit configured to transmit driving force from a driving source to the rotating member when the first gear and the second gear are configured to rotate in a first direction, wherein, in a state where the first engaging portion and the second engaging portion are engaged with each other and the first gear is rotating in the first direction, a first surface of the first engaging portion transmits the driving force from the first gear to the second gear, wherein the first surface is inclined in such a direction that the first engaging portion or the second engaging portion can retract, in a direction against the urging force of the urging member, to release the engagement with the other of the engaging portions while the first engaging portion rotates in the first direction, wherein the first gear is a helical gear that includes helical teeth having a direction of twist, and the direction of twist of the helical teeth in the first gear is a direction configured to generate an axial force with respect to the urging direction of the urging member.

Further features will become apparent from the following description of embodiments with reference to the attached drawings.

DESCRIPTION OF THE EMBODIMENTS

Embodiments will now be described in detail with reference to the drawings. In the following embodiments, an example using a laser beam printer including the sheet conveying device will be described. However, the constituent elements described in the following embodiments are merely examples, and the scope of the present disclosure is not limited to them.

Embodiment 1

Configuration of Image Forming Apparatus

Figure 1:
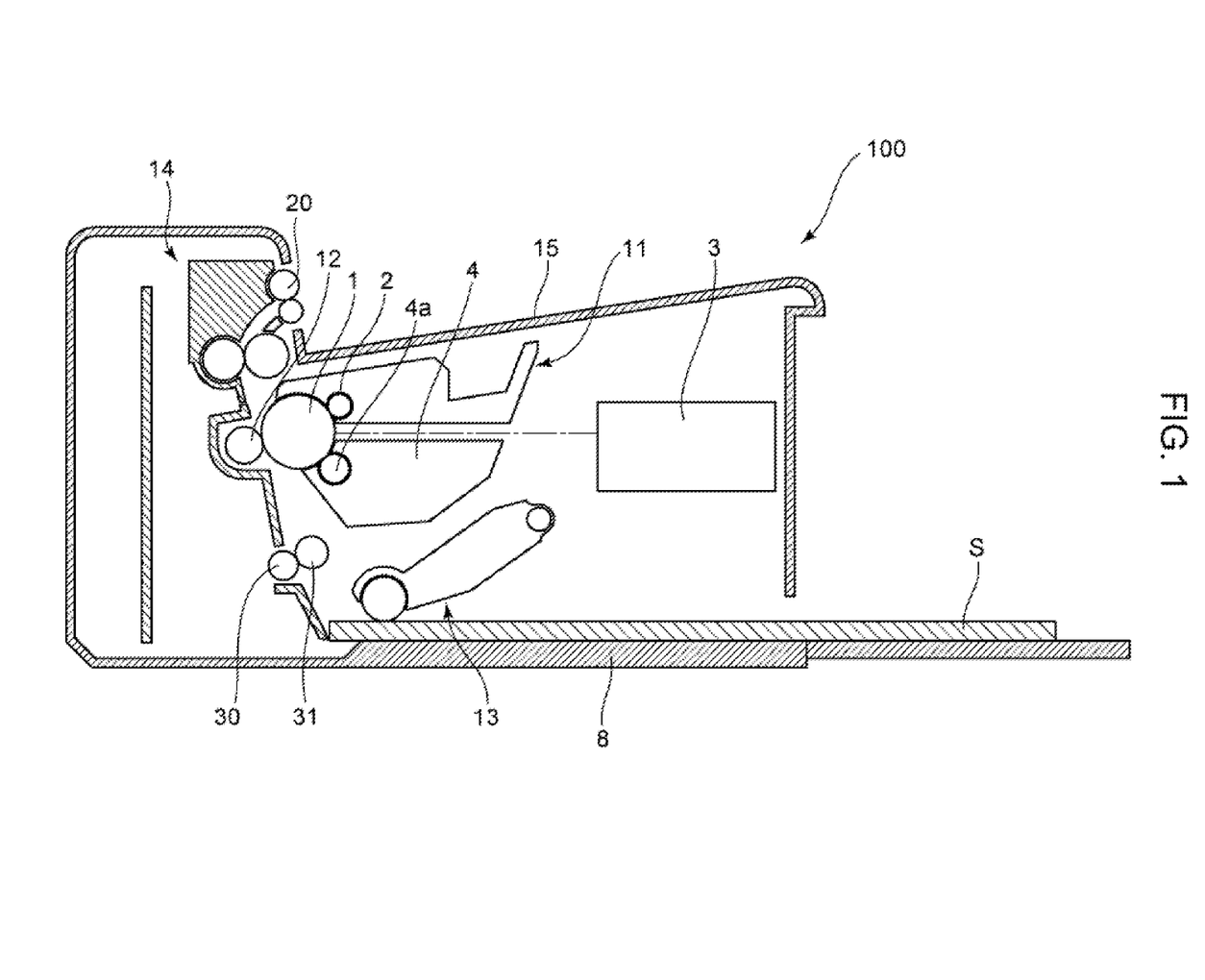
FIG. 1 is a schematic cross-sectional view illustrating the configuration of an image forming apparatus according to Embodiment 1.

FIG. 1 is a schematic cross-sectional view illustrating the configuration of an image forming apparatus 100 including the sheet conveying device of this embodiment. As shown in FIG. 1, the image forming apparatus 100 includes a process cartridge 11 as an image forming unit, a feed unit 13, and a fixing unit 14. The process cartridge 11 has a drum-shaped electrophotographic photosensitive member (hereinafter referred to as photosensitive drum) 1, a charging roller 2, and a developing unit 4.

When the image forming operation is started, the photosensitive drum 1 is uniformly charged to a predetermined potential of the same polarity (negative polarity in this embodiment) as the normal charging polarity of toner by the charging roller 2. Thereafter, by receiving exposure from an exposure unit 3, an electrostatic latent image corresponding to the target image is formed on the surface of the photosensitive drum 1. Then, the electrostatic latent image is developed and visualized as a toner image at a position where a developing roller 4a carrying the toner accommodated in the developing unit 4 and the photosensitive drum 1 are in contact with each other.

The toner image developed on the photosensitive drum 1 is transferred to the surface of a sheet S fed by the feed unit 13 in the course of passing through the transfer nip between the photosensitive drum 1 and a transfer roller 12. The sheets S are stored in a sheet feed tray 8 as a storage portion in a stacked state. The sheet S to which the toner image is transferred is introduced into the fixing unit 14, where it is heated and pressed and the toner thereby melts and is fixed to the sheet S. Thereafter, the sheet S on the surface of which the image is formed is discharged to the sheet discharge tray 15 as a stacking unit.

In this embodiment, image formation is completed by the above operation.

Sheet Feeding Operation

Figure 2A:
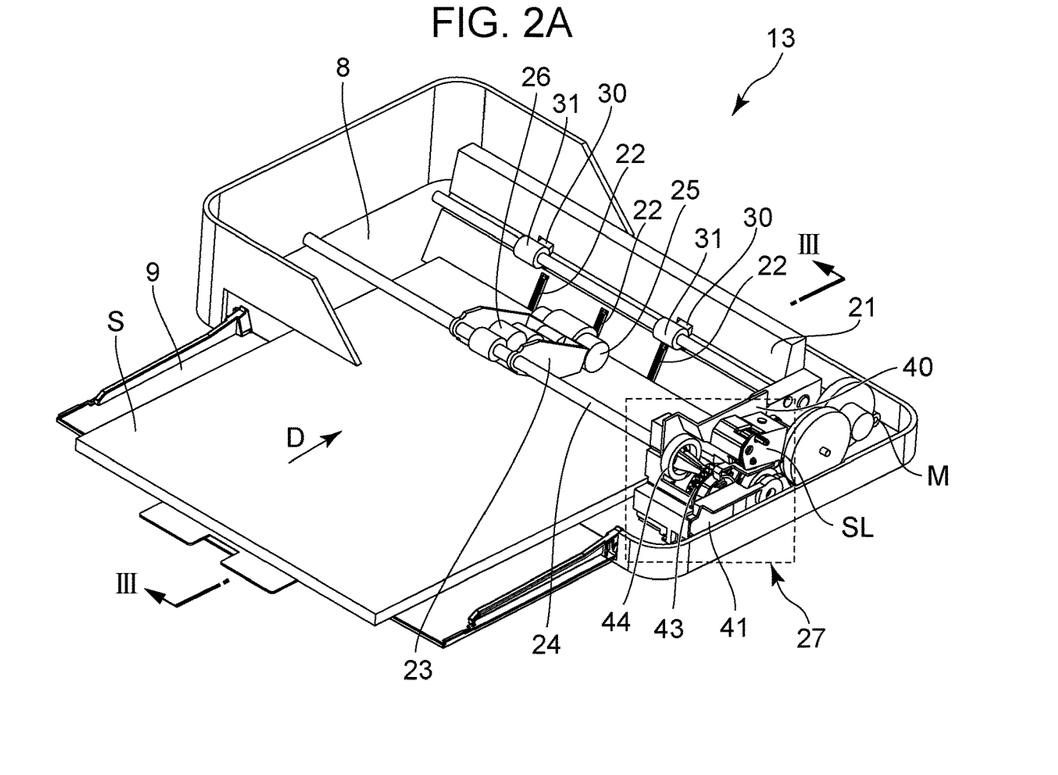
FIG. 2A is a schematic diagram illustrating the configuration of a feed unit in Embodiment 1.
Figure 2B:
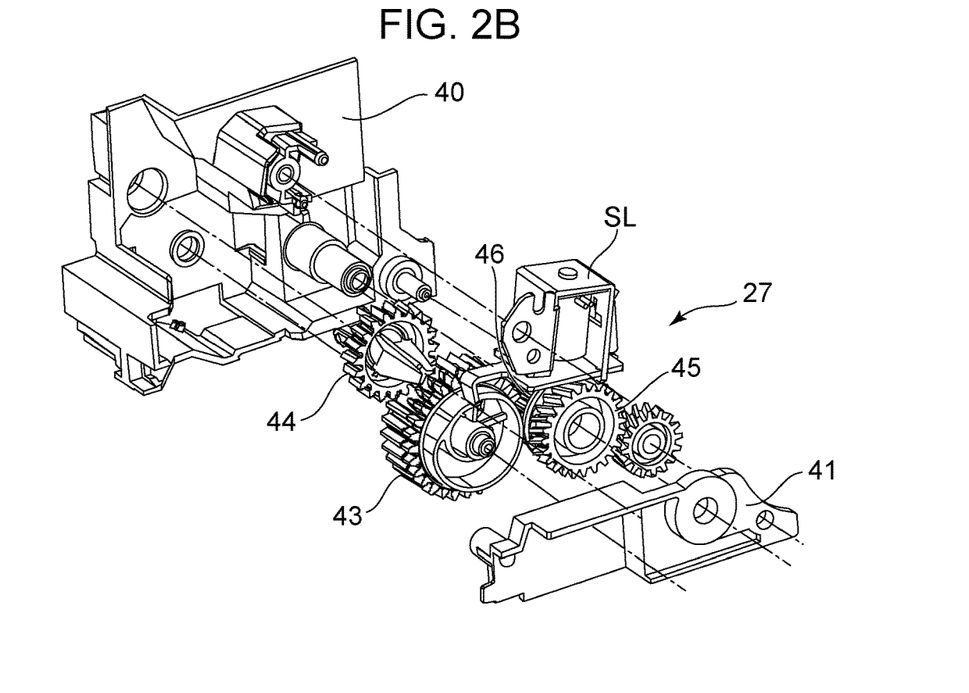
FIG. 2B is a schematic diagram illustrating the configuration of a drive transmission unit in Embodiment 1.
Figure 3:
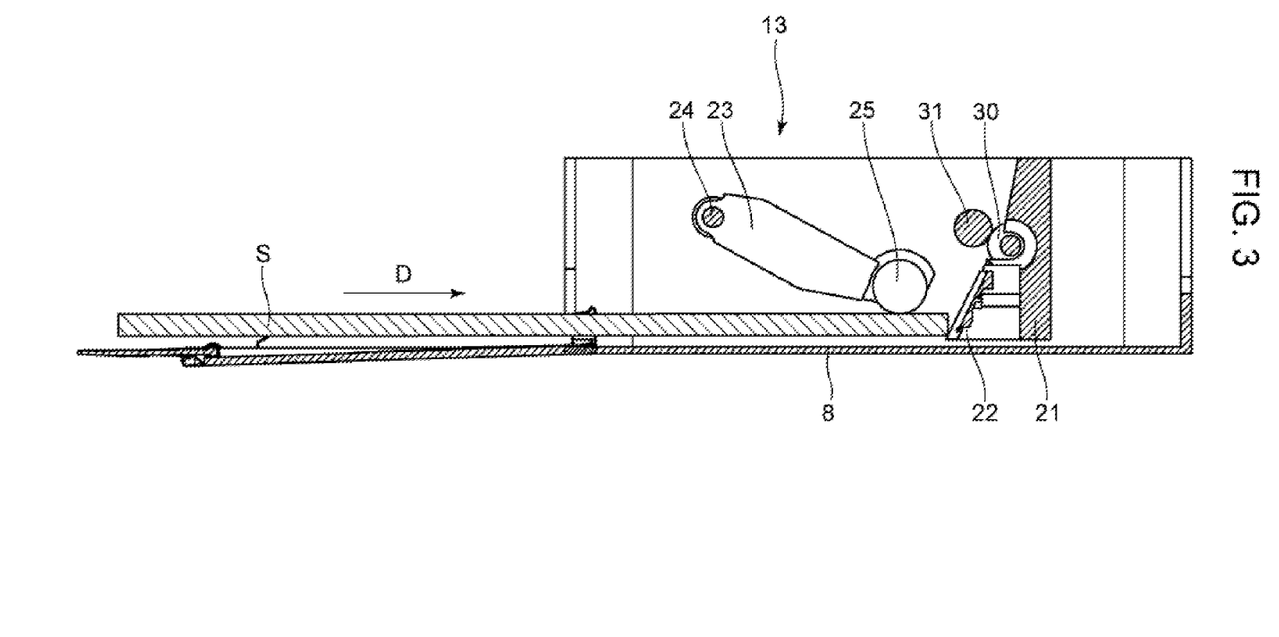
FIG. 3 is a schematic sectional view illustrating the configuration of the feed unit in Embodiment 1.

Next, the feeding of the sheet S in this embodiment will be described with reference to FIGS. 2A, 2B, and 3. FIG. 2A is a schematic perspective view for explaining the configuration of the feed unit 13 that feeds the sheet S in this embodiment, and FIG. 2B is a schematic diagram illustrating the configuration of a drive transmission unit 27 that transmits the drive to the feed unit 13. FIG. 3 is a schematic cross-sectional view illustrating the feed unit 13 taken along line III-III of FIG. 2A.

As shown in FIG. 2A, the sheets S are stored in the sheet feed tray 8 in a state where the side surfaces of the sheets S are aligned by a side guide (not shown). An inclined surface 21 as a conveyance guide is provided on the downstream side of the feed unit 13 with respect to the direction D, which is the sheet conveying direction, and separating members 22 for separating the fed sheets S one by one is disposed on the inclined surface 21. As described above, in this embodiment, the inclined surface separating method is used as a method for separating the sheets S, and the sheets S are separated one by one after coming into contact with the inclined surface 21 having the separating members 22.

Above the sheet feed tray 8 with respect to the gravitational direction orthogonal to the sheet conveying direction, a feeding roller 25 (rotating member) that comes into contact with the surface of the sheet S and feeds the sheet S, and a sheet feed arm 23 as a holding member that holds the feeding roller 25 are disposed. The sheet feed arm 23 can move in the gravitational direction according to the stacking height of the sheets S stacked on the sheet feed tray 8 by pivoting around the pivot shaft 24. Further, the feeding roller 25 is disposed on the downstream side of the pivot shaft 24 with respect to the direction D. With this arrangement, the sheet feed arm 23 can press the rotating feeding roller 25 against the sheets S.

Driving force is transmitted from a drive transmission unit 27, which will be described later, via the pivot shaft 24 and a gear train 26 to the feeding roller 25, and the feeding roller 25 thereby rotates. When the feeding roller 25 rotates, the sheet feed arm 23 presses the feeding roller 25 against the sheets S, and the frictional force generated at the position where the feeding roller 25 and the sheets S are in contact causes the sheets S to move in the D direction. Thereafter, the sheets S are separated one by one when they pass on the separating members 22.

On the downstream side of the separating members 22 with respect to the D direction, conveying rollers 30 that convey the separated sheet S toward the transfer nip are provided. Conveyance idle rollers 31 urged toward the conveying rollers 30 by an urging unit (not shown) are provided on the opposing side of the conveying rollers 30, and conveying nips are formed at positions where the conveying rollers 30 and the conveyance idle rollers 31 contact each other. The sheet S separated by the separating members 22 is conveyed to the transfer nip by the rotation of the conveying rollers 30 after being nipped by the conveying nips.

Configuration of Drive Transmission Unit

Next, the drive transmission unit 27 will be described. As shown in FIG. 2A, the drive transmission unit 27 is held by a guide 40 and a gear cover 41, and drive is transmitted from a drive motor M as a driving source via several gears. As shown in FIG. 2B, the drive transmission unit 27 includes a partially-toothless gear 43, a solenoid SL, a ratchet gear 45 (a first gear), a ratchet gear 46 (a second gear), and a spring 47 as an urging member.

The driving force from the drive motor M is transmitted from the partially-toothless gear 43 to the ratchet gear 45, and is transmitted from the ratchet gear 45 to the ratchet gear 46 and then to the feeding roller 25 via the pivot shaft 24 and the gear train 26. The partially-toothless gear 43 and the ratchet gear 45 are not in mesh with each other during non-sheet feeding operation. When the sheet feeding solenoid SL is pulled in order to start the sheet feeding operation by a control unit (not shown), the partially-toothless gear 43 and the ratchet gear 45 mesh with each other and the driving force is transmitted. The partially-toothless gear 43 and a shaft gear 44 are also not in mesh with each other during non-sheet feeding operation. When the solenoid SL is pulled, the two gears mesh with each other after a predetermined number of revolutions, and finally, the drive is transmitted to the feeding roller 25.

When the partially-toothless gear 43 rotates once, the sheet feeding operation for one sheet S is completed, and each member returns to the initial state at the time of non-sheet feeding operation.

Figure 4A:
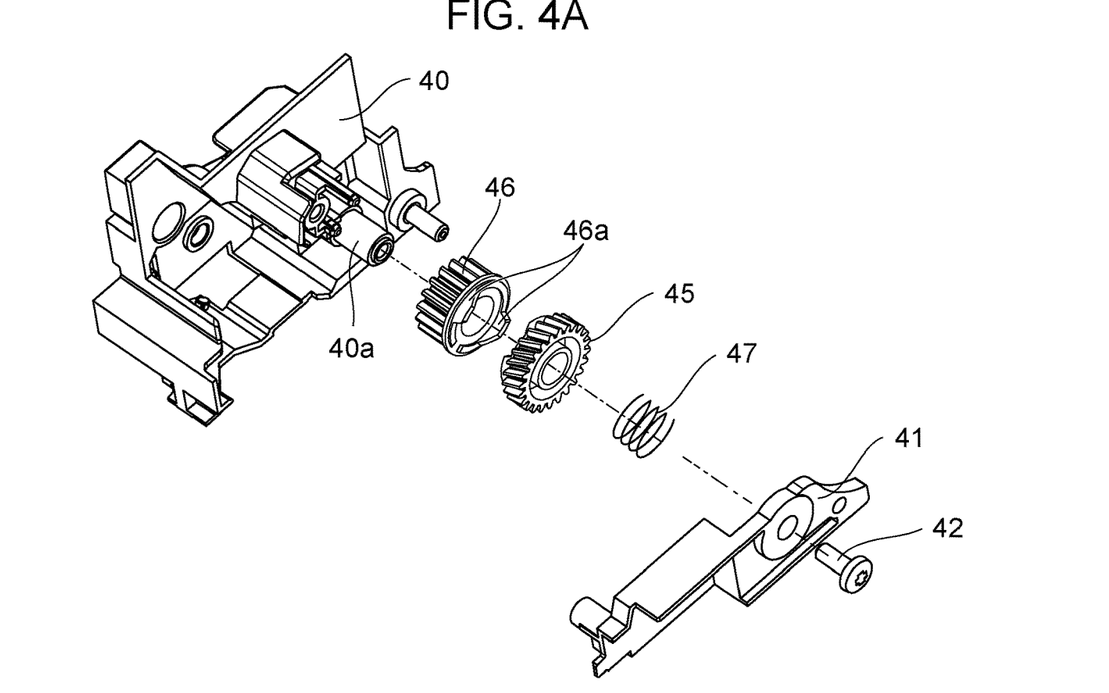
FIG. 4A is an exploded perspective view of the drive transmission unit as viewed from the upstream side in the sheet conveying direction in Embodiment 1.
Figure 4B:
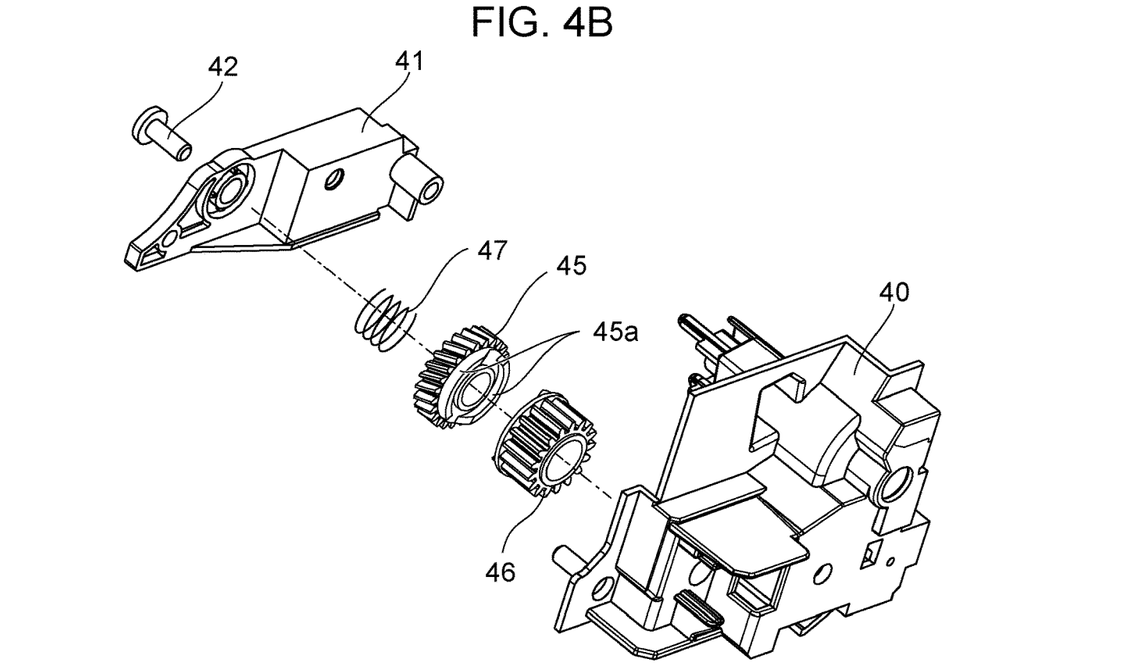
FIG. 4B is an exploded perspective view of the drive transmission unit as viewed from the downstream side in the sheet conveying direction in Embodiment 1.
Figure 5A:
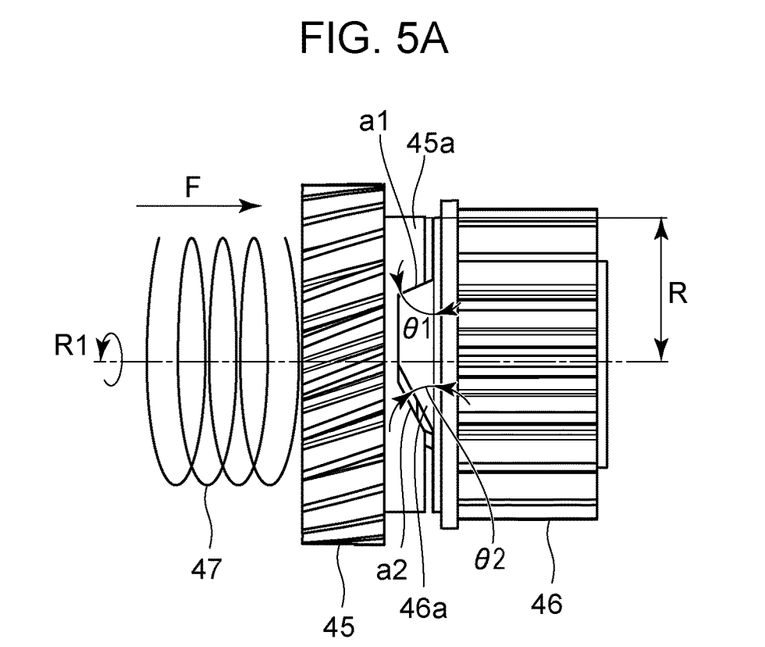
FIG. 5A is a schematic diagram illustrating a state where a first engaging portion and a second engaging portion are engaged with each other in Embodiment 1.
Figure 5B:
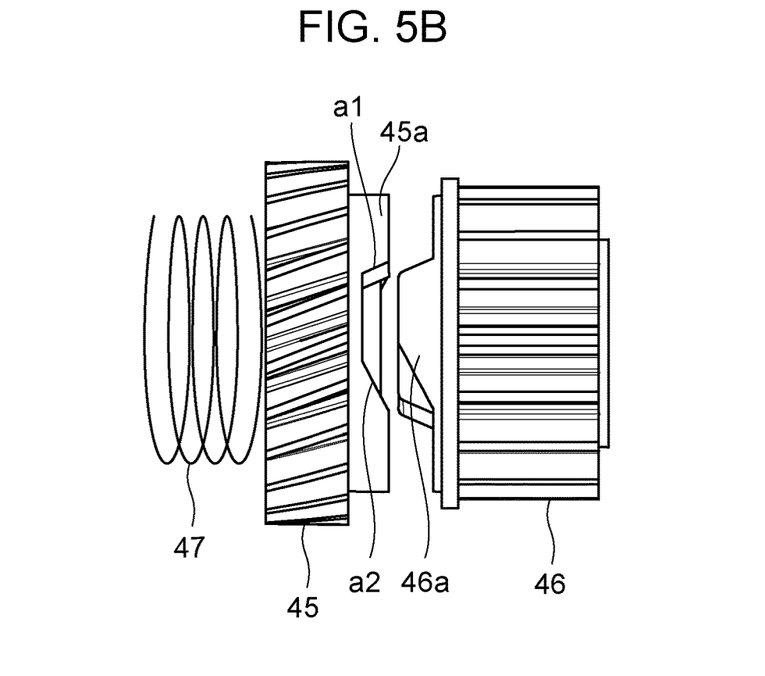
FIG. 5B is a schematic diagram illustrating a state where engagement between the first engaging portion and the second engaging portion is released in Embodiment 1.

Hereinafter, the driving force transmission mechanism in the drive transmission unit 27 will be described with reference to FIGS. 4A, 4B, 5A, and 5B. FIG. 4A is an exploded perspective view of the ratchet gear 45 and the ratchet gear 46 as viewed from the upstream side in the conveying direction of the sheet S. FIG. 4B is an exploded perspective view of the ratchet gear 45 and the ratchet gear 46 as viewed from the downstream side in the conveying direction of the sheet S. FIG. 5A is a schematic diagram illustrating a state where the ratchet gear 45 and the ratchet gear 46 are engaged with each other. FIG. 5B is a schematic diagram illustrating a state where the engagement between the ratchet gear 45 and the ratchet gear 46 is released.

As shown in FIGS. 4A and 4B, the ratchet gear 45 and the ratchet gear 46 are rotatably held by a shaft 40a provided on the guide 40, and are fastened to the shaft 40a with a screw 42, with the spring 47 and the gear cover 41 interposed therebetween. The shaft 40a also serves as a positioning of the ratchet gear 45 and the ratchet gear 46 with respect to the axial direction and a planar direction that is a direction perpendicular to the axial direction. As a result, it is possible to precisely determine the distance between the axes of the partially-toothless gear 43 and the ratchet gear 45.

The ratchet gear 45 and the ratchet gear 46 are respectively provided with a first engaging portion 45a and a second engaging portion 46a having protrusions or recesses for engaging these gears with each other. By integrally providing the engaging portion for engaging the gears and the gear portion for transmitting the drive, it is possible to lengthen the fitting length between the gear and the shaft, and to suppress the inclination of the gear.

As shown in FIG. 5A, the ratchet gear 45 and the ratchet gear 46 are engaged with each other by engaging the first engaging portion 45a and the second engaging portion 46a with each other. The first engaging portion 45a is provided with an inclined surface a1 (first surface) and an inclined surface a2 (second surface), and the inclined surface a1 is a surface through which the ratchet gear 45 rotating in the direction of the arrow R1 shown in the figure (first direction) transmits the driving force to the ratchet gear 46.

The inclined surface a2 is a surface where, when the feeding roller 25 is affected by external force and the ratchet gear 46 rotates in the direction of the arrow R1 in the figure in a state where the transmission of the drive from the drive motor M is stopped, the second engaging portion 46a comes into contact with the first engaging portion 45a. Here, the R1 direction is a direction in which, when the feeding roller 25 feeds the sheet S, the ratchet gear 45 or the ratchet gear 46 rotates by receiving the driving force from the drive motor M.

At the time of normal sheet passing, as shown in FIG. 5A, in a state where the first engaging portion 45a and the second engaging portion 46a are engaged with each other, the ratchet gear 45 and the ratchet gear 46 rotate by receiving the driving force from the drive motor M in the R1 direction in the figure. However, for example, if a stagnation (hereinafter referred to as a jam) of the sheet S occurs during the sheet feeding operation, the frictional force generated between the feeding roller 25 and the sheet S increases, and thereby an excessive torque may be applied to parts that transmit the driving force from the drive motor M. In particular, in the case of the image forming apparatus using the inclined surface separating method, if the driving force from the drive motor M continues to be transmitted to the feeding roller 25, the force with which the sheet feed arm 23 presses the sheet S increases, and the frictional force between the feeding roller 25 and the sheet S increases easily. If this state continues, deformation or breakage may occur in gears and the like transmitting the driving force from the drive motor M.

Therefore, in this embodiment, as shown in FIG. 5B, these gears are disengaged before the torque transmitted from the drive motor M exceeds an allowable torque deforming or breaking the ratchet gear 45 and the ratchet gear 46. Specifically, the angle of the inclined surface a1 where the first engaging portion 45a and the second engaging portion 46a are engaged with each other is set to such an angle that while the first engaging portion 45a rotates in the R1 direction, the ratchet gear 45 can retract in a direction (retract direction) against the urging force of the spring 47 to release the engaged state.

Here, in the configuration of this embodiment, when the allowable torque in a state where the ratchet gear 45 and the ratchet gear 46 rotate in the R1 direction is T1, the allowable torque T1 [N·mm] and the inclination angle $\theta 1$ [°] of the inclined surface a1 satisfies the following Expression 1. In Expression 1, R [mm] is the length of a perpendicular drawn from the inclined surface a1 toward the axis line of the ratchet gear 45, $\mu$ is the friction coefficient of the first engaging portion 45a and the second engaging portion 46a, and F [gf] is the urging force of the spring 47. Hereinafter, they are referred to as transmission radius R, friction coefficient $\mu$, and urging force F, respectively.

$$T1 > (R \cdot F(\sin\theta 1 + \mu \cos\theta 1)/(\cos\theta 1 - \mu \sin\theta 1)) \quad \text{(Expression 1)}$$

In this embodiment, since the inclined surface a2 is provided, when the feeding roller 25 is affected by the external force in a state where the transmission of the drive from the drive motor M is stopped, the engagement between the first engaging portion 45a and the second engaging portion 46a can be released. That is, similarly to the inclined surface a1, the angle of the inclined surface a2 is set to such an angle that while the second engaging portion 46a rotates in the R1 direction, the ratchet gear 45 or the ratchet gear 46 can retract in the direction (retract direction) against the urging force of the spring 47 to release the engaged state.

In the case where a jam occurs during the sheet feeding operation and the sheet S is pulled in the D direction (shown in FIG. 3) to perform jam clearance in a state where the gears of the drive transmission unit 27 are meshed, the feeding roller 25 tries to rotate in the D direction and the ratchet gear 46 thereby tries to rotate in the R1 direction. According to the configuration of this embodiment, in this state, by releasing the engaged state between the ratchet gear 45 and the ratchet gear 46 before exceeding the allowable torque, the gears and the like that transmit the driving force from the drive motor M can be prevented from being deformed or broken.

Here, when the allowable torque when the ratchet gear 46 rotates in the R1 direction in a state where the transmission of the drive from the drive motor M is stopped is T2, the allowable torque T2 and the angle $\theta 2$ of the inclined surface a2 satisfy the following Expression 2. The transmission radius R, the friction coefficient $\mu$, and the urging force F in Expression 2 are the same as those in Expression 1.

$$T2 > (R \cdot F(\sin\theta 2 + \mu \cos\theta 2)/(\cos\theta 2 - \mu \sin\theta 2)) \quad \text{(Expression 2)}$$

The torque at which the ratchet gear 45 and the ratchet gear 46 rotating in the R1 direction by receiving the driving force from the drive motor M are disengaged (hereinafter referred to as limit torque) should satisfy the following conditions. That is, the limit torque in this case should be equal to or greater than the torque required for the operation of feeding the sheet S by the feeding roller 25 (hereinafter referred to as required torque) and less than the allowable torque. On the other hand, the limit torque when the ratchet gear 46 rotates in the R1 direction in a state where the transmission of the drive from the drive motor M is stopped may be less than the allowable torque.

In the configuration of this embodiment, the material of the ratchet gear 45 and the ratchet gear 46 is a polyoxymethylene (POM) resin, and the friction coefficient $\mu$ in Expressions 1 and 2 is about 0.05 to 0.15. Not limited to the configuration of this embodiment, when the inclination angle $\theta 1$ or the angle $\theta 2$ of the inclined surface a1 or the inclined surface a2 is large, the transmission radius R is large, and the urging force F is large, a greater torque can be transmitted. However, if the inclination angle $\theta 1$ or $\theta 2$ is large, the limit torque varies depending on the magnitude of the friction coefficient which is not preferable.

In the case where the transmission radius R cannot be increased due to design restrictions, in order to satisfy the condition of the limit torque when rotating in the R1 direction, the urging force F has to be increased. However, if the urging force F is increased, there are concerns such as deterioration in assemblability, abrasion due to endurance, increase in operation noise, and the like. Therefore, in the configuration of this embodiment, as shown in FIGS. 5A and 5B, the tooth surface of the ratchet gear 45 transmitting the driving force from the drive motor M is formed as a helical tooth configuration (helical gear).

More specifically, the direction of twist of the helical teeth is such a direction that, when the ratchet gear 45 rotates in the R1 direction, an axial force (thrust force) that increases the urging force with respect to the urging direction of the spring 47 is generated. The angle of twist is set to 20°. Thereby, it is possible to satisfy the necessary limit torque condition without providing a large spring to increase the urging force of the spring 47 and while providing an allowable range for the variation of the friction coefficient μ.

Figure 6:
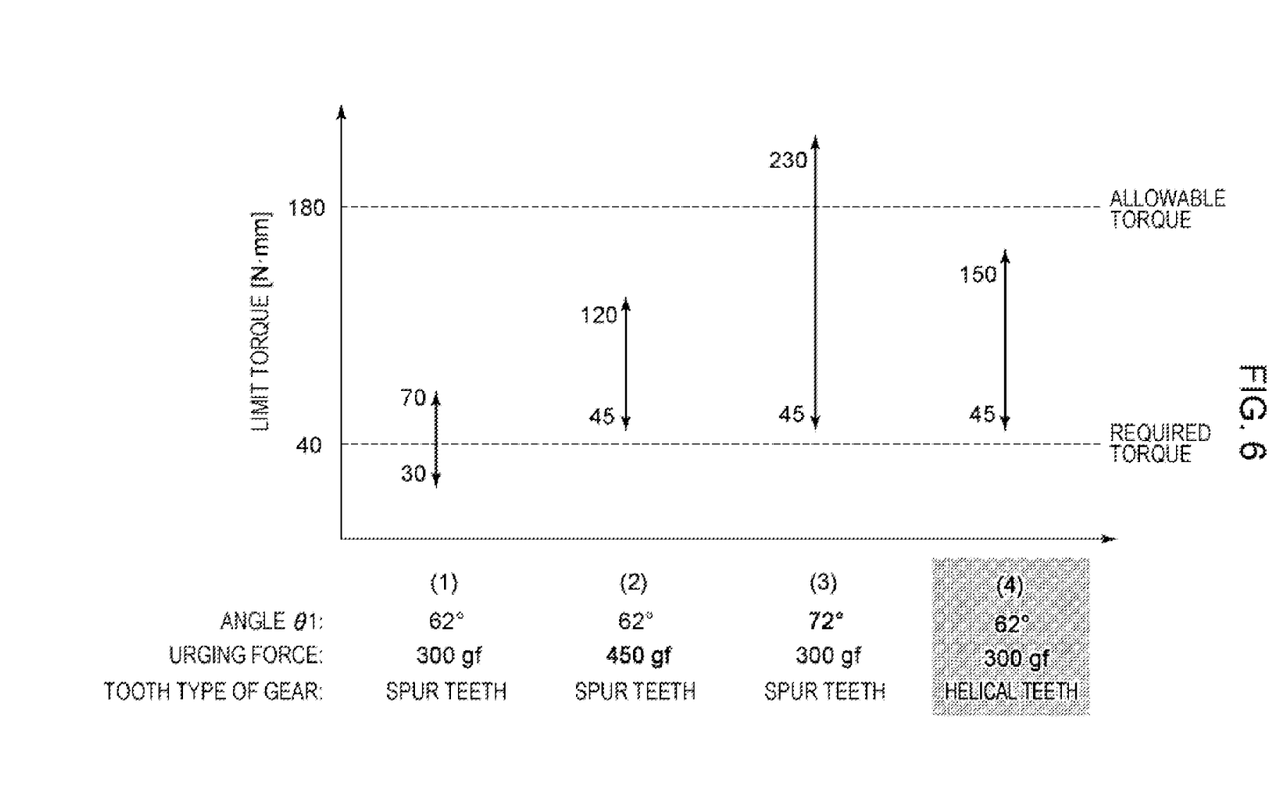
FIG. 6 is a graph illustrating the torque relationship in Embodiment 1.

FIG. 6 is a graph in which limit torques when the ratchet gear 45 rotates in the R1 direction are arranged by conditions (the value of the inclination angle θ1, the urging force of the spring 47, the tooth type of the ratchet gear 45). In the condition (1), the tooth type of the gear is set to spur teeth, the inclination angle θ1 of the inclined surface a1 is set to 62°, and the urging force F of the spring 47 is set to 300 gf.

In the condition (1), the ratchet gear 45 and the ratchet gear 46 are disengaged from each other before exceeding the allowable torque, but in consideration of variations in the friction coefficients etc. of the respective members, there may be cases where the condition of the required torque is not satisfied.

In the condition (2), the urging force of the spring 47 is set larger them in the condition (1), and under this condition, the limit torque satisfies the conditions of both the allowable torque and the required torque. However, in the condition (2), a spring having an urging force 1.5 times larger than the spring used in the condition (1) is required.

In the condition (3), the inclination angle θ1 is set larger than in the condition (1), and it is 72°. Under this condition, the condition of the required torque is satisfied, but in consideration of variations in the friction coefficients etc. of the respective members, there may be cases where the condition of the allowable torque is not satisfied.

In the condition (4), the tooth type of the gear is changed from spur teeth in the condition (1) to helical teeth. Under this condition, without setting the urging force of the spring 47 large, the limit torque fell within the range that satisfies conditions of both the allowable torque and the required torque.

Furthermore, in this embodiment, the R1 direction is set such that when the ratchet gear 45 rotates in the R1 direction, the screw 42 in FIGS. 4A and 4B is tightened. As a result, even when the ratchet gear 45 and the ratchet gear 46 rotate in the R1 direction and continue to rotate under a load, it is possible to prevent the loosening of the screw 42 and lack of the urging force of the spring 47 or the disengagement of the fastening of the screw 42.

In this embodiment, two first engaging portions 45a and two second engaging portions 46a are provided for the ratchet gear 45 or the ratchet gear 46. However, without being limited to this, as long as the engagement is released before exceeding the allowable torque in a state where the ratchet gear 45 and the ratchet gear 46 rotate in the R1 direction, the engagement shape of the first engagement portion 45a and the second engagement portion 46a may be set as appropriate.

In this embodiment, the gear tooth type of the ratchet gear 46 is set to spur teeth, but it may be set to helical teeth. Further, in this embodiment, the spring 47 is disposed at such a position that the ratchet gear 45 urges the ratchet gear 46. However, the present disclosure is not limited thereto, and the spring 47 may be disposed at such a position that the ratchet gear 46 urges the ratchet gear 45.

Embodiment 2

In Embodiment 1, the drive transmission unit 27 that transmits the drive from the drive motor M to the feeding roller 25 has been described. In contrast, in Embodiment 2, a drive transmission unit 52 that transmits the drive from the drive motor M to the conveying rollers 30 will be described. In the following description, the same reference numerals are given to the configurations and operations common to those of Embodiment 1, and description thereof is omitted.

Figure 7:
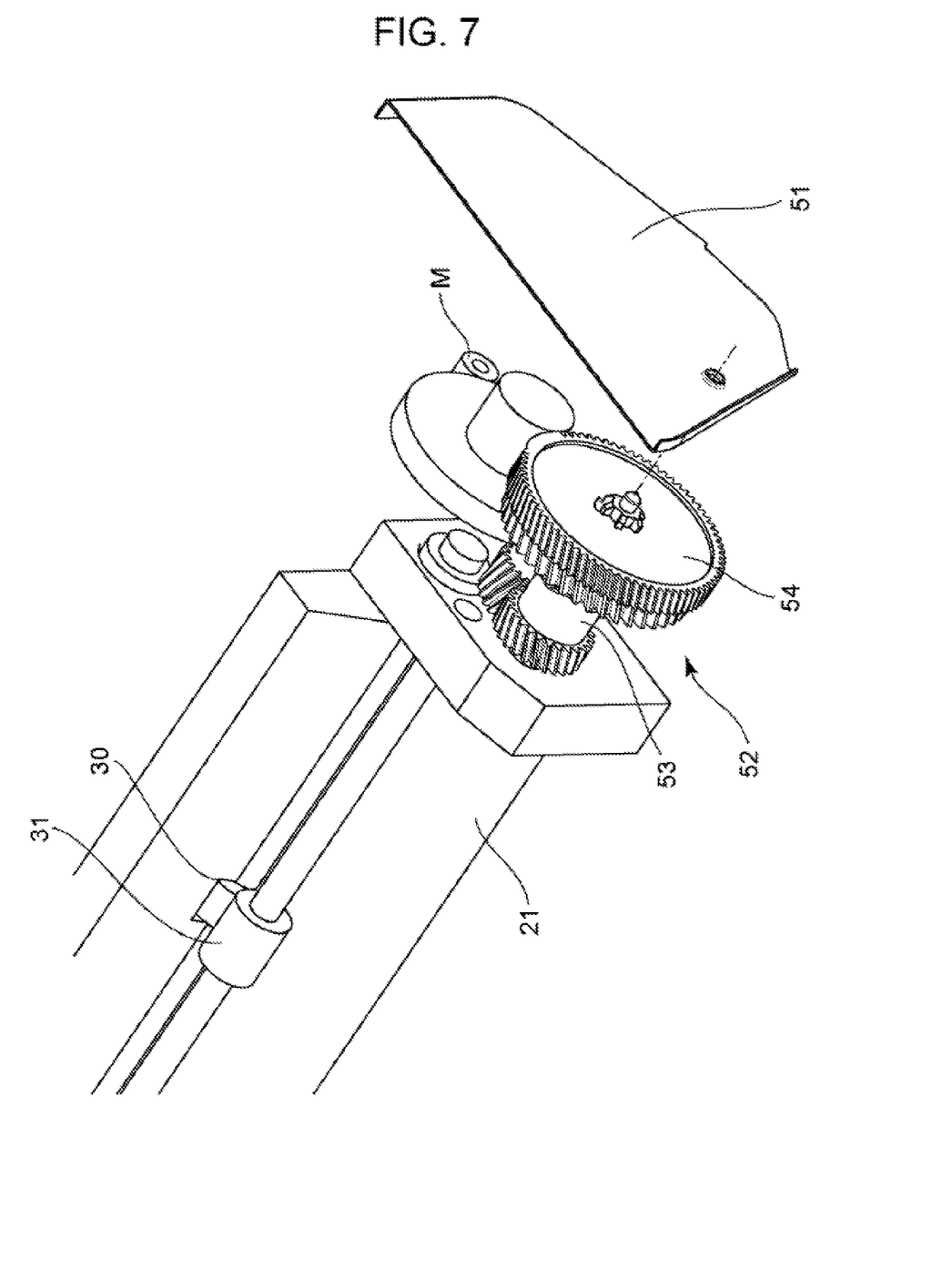
FIG. 7 is a schematic diagram illustrating the configuration of a drive transmission unit in Embodiment 2.

FIG. 7 is a schematic diagram illustrating the configuration of the drive transmission unit 52 in this embodiment. As shown in FIG. 7, the drive transmission unit 52 is held by a guide 21 and a conveying cover 51, and transmits the driving force from the drive motor M to the conveying rollers 30. The drive transmission unit 52 has a ratchet gear 54 (first gear) and a ratchet gear 53 (second gear).

Figure 8A:
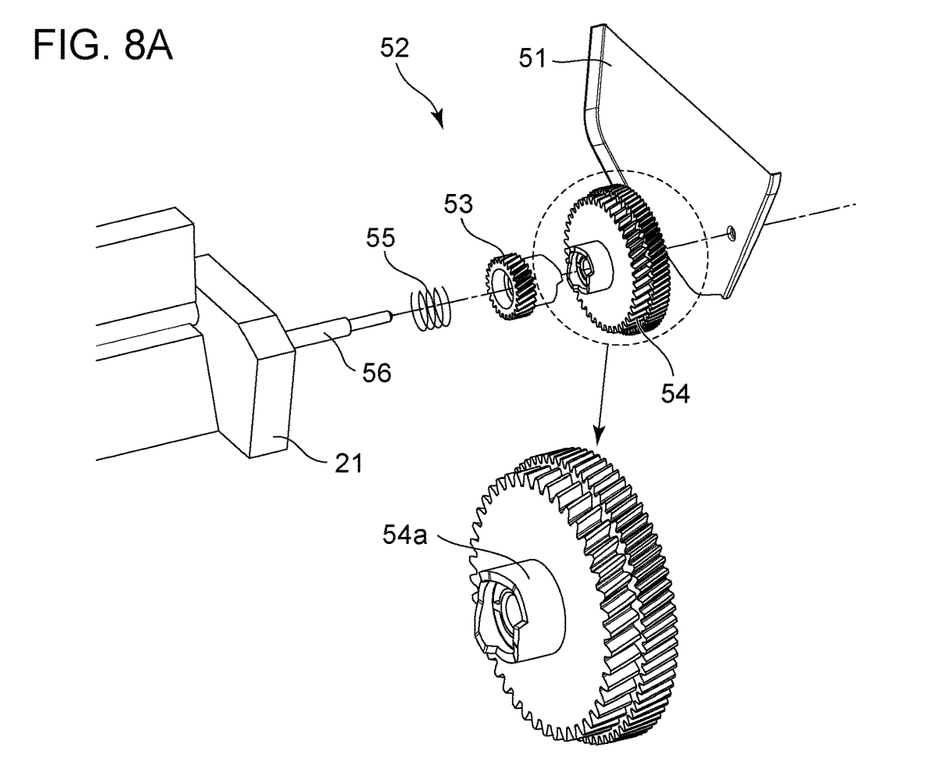
FIG. 8A is a schematic diagram illustrating the configuration of a first engaging portion of the drive transmission unit in Embodiment 2.
Figure 8B:
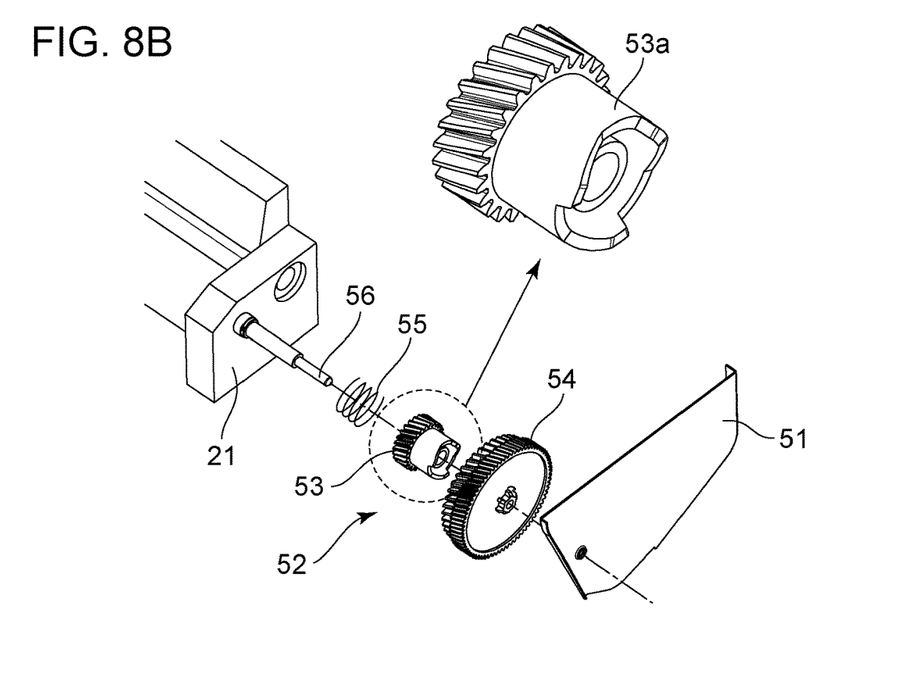
FIG. 8B is a schematic diagram illustrating the configuration of a second engaging portion of the drive transmission unit in Embodiment 2.

FIG. 8A is a schematic diagram illustrating the configuration of the ratchet gear 54, and FIG. 8B is a schematic diagram illustrating the configuration of the ratchet gear 53. As shown in FIGS. 8A and 8B, similarly to Embodiment 1, the ratchet gear 54 and the ratchet gear 53 are respectively provided with a first engaging portion 54a and a second engaging portion 53a having protrusions or recesses for engaging these gears with each other. In addition, the ratchet gear 54 and the ratchet gear 53 are rotatably held by a shaft 56 fitted in the guide 21, and are fastened to the conveying cover together with a spring 55 (urging member).

Figure 9A:
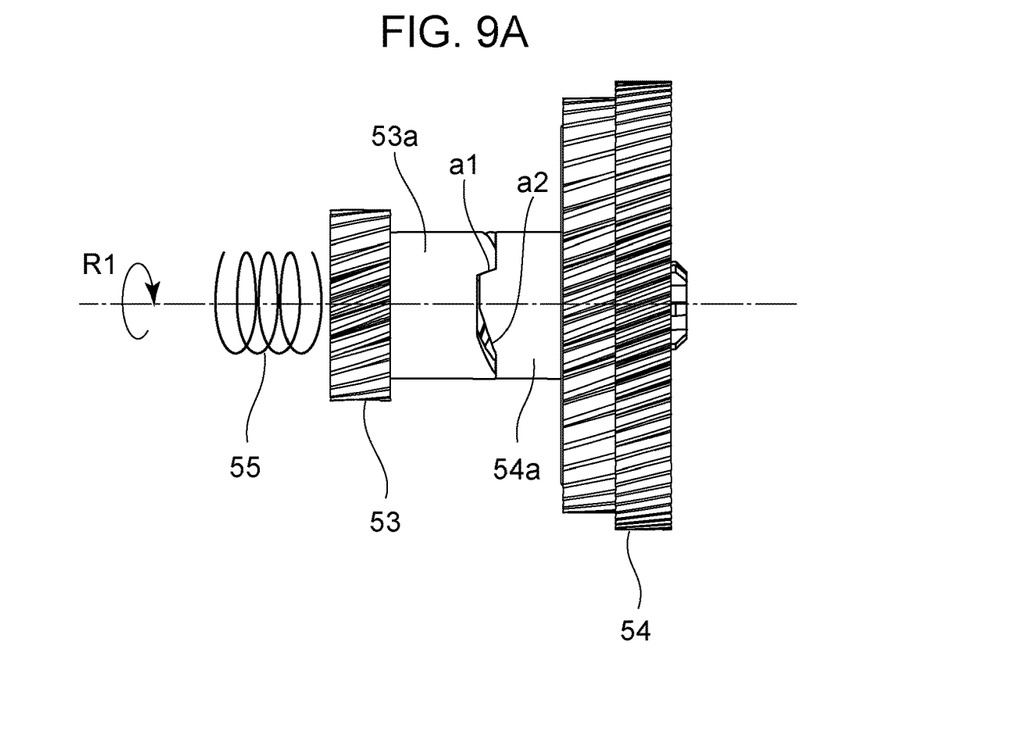
FIG. 9A is a schematic diagram illustrating a state where the first engaging portion and the second engaging portion are engaged with each other in Embodiment 2.
Figure 9B:
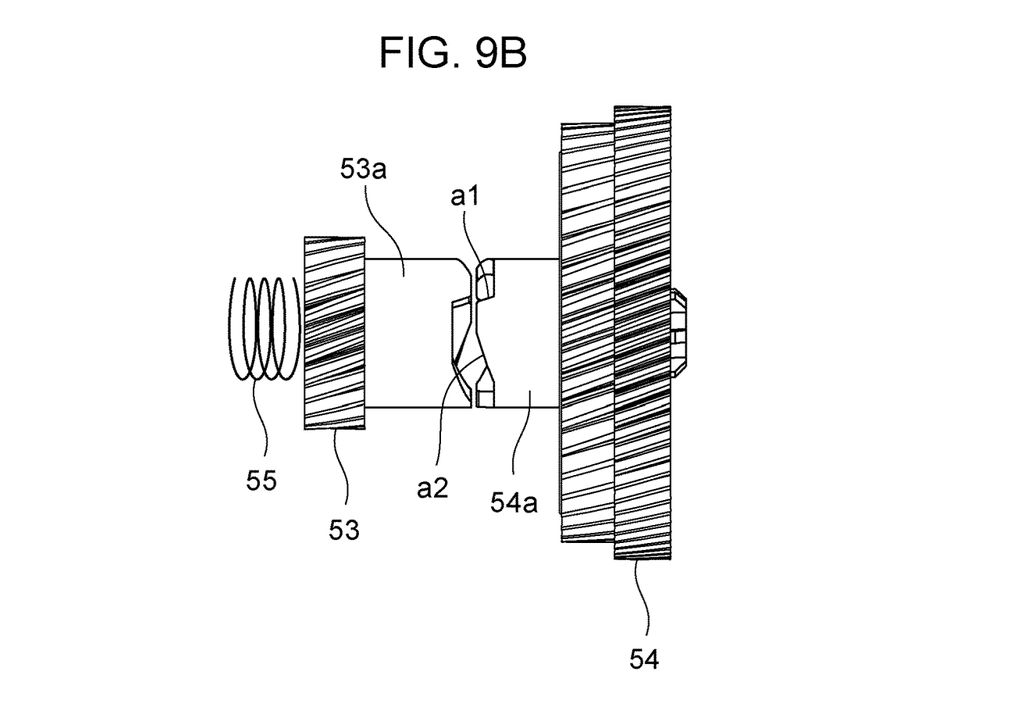
FIG. 9B is a schematic diagram illustrating a state where engagement between the first engaging portion and the second engaging portion is released in Embodiment 2.

FIG. 9A is a schematic diagram illustrating a state where the ratchet gear 54 and the ratchet gear 53 are engaged with each other, and FIG. 9B is a schematic diagram illustrating a state where the engagement between the ratchet gear 54 and the ratchet gear 53 is released.

As shown in FIG. 9A, the ratchet gear 54 and the ratchet gear 53 are engaged with each other by engaging the first engaging portion 54a and the second engaging portion 53a. The first engaging portion 54a is provided with an inclined surface a1 (first surface) and an inclined surface a2 (second surface), and the inclined surface a1 is a surface through which the ratchet gear 54 rotating in the direction of the arrow R1 shown in the figure (first direction) transmits the driving force to the ratchet gear 53.

The inclined surface a2 is a surface where, when the conveying rollers 30 are affected by external force and the ratchet gear 53 rotates in the direction of the arrow R1 in the figure in a state where the transmission of the drive from the drive motor M is stopped, the second engaging portion 53a comes into contact with the first engaging portion 54a. Here, the R1 direction is a direction in which, when the conveying rollers 30 convey the sheet S, the ratchet gear 54 or the ratchet gear 53 receiving the driving force from the drive motor M rotates.

Also in this embodiment, as in Embodiment 1, the ratchet gear 54 is provided with the inclined surface a1 and the inclined surface a2, and the limit torque when the ratchet gear 54 and the ratchet gear 53 rotate is appropriately set. As a result, as shown in FIG. 9B, these gears are disengaged before the torque transmitted from the drive motor M exceeds an allowable torque deforming or breaking the ratchet gear 54 and the ratchet gear 53. Here, the relationship between the angle of each inclined surface and the limit torque and the allowable torque is the same as the relationship between Expression 1 and Expression 2 shown in Embodiment 1, so the description is omitted.

At the time of normal sheet passing, if a jam occurs when the conveying rollers 30 convey the sheet S, or the conveying rollers 30 do not rotate due to component deterioration, an excessive torque is applied between the sheet S and the conveying rollers 30. If this state continues, deformation or breakage may occur in gears and the like transmitting the driving force from the drive motor M. When, in order to perform jam clearance, the sheet S is pulled and removed in the conveying direction in a state where transmission of the drive from the drive motor M is stopped, maintaining the state where the first engagement portion 54a and the second engagement portion 53a are engaged may cause deformation or breakage of these components.

According to this embodiment, by providing the inclined surface a1 and the inclined surface a2, it is possible to release the engaged state between the first engaging portion 54a and the second engaging portion 53a when excessive torque is applied, and the same effect as in Embodiment 1 can be obtained.

In this embodiment, the tooth surfaces of the ratchet gear 53 and the ratchet gear 54 are formed as a helical tooth configuration (helical gear). The direction of twist of the helical teeth is such a direction that when rotating in the R1 direction, an axial force (thrust force) is generated with respect to the urging direction of the spring 55. The angle of twist is set to 20°. Thereby, it is possible to satisfy the necessary limit torque condition without providing a large spring to increase the urging force of the spring 55 and while providing an allowable range for the variation of the friction coefficient.

The above embodiments show examples of the configuration of the present disclosure, and the present disclosure is not limited to them. For example, the configuration of the present disclosure may be applied to a drive transmission unit that transmits drive to a fixing unit, a drive transmission unit in an image forming unit such as a photosensitive drum or a developing unit.

In the above embodiments, a monochrome image forming apparatus 100 including one process cartridge accommodating a single color toner has been described. However, the present disclosure is not limited to this, and the present disclosure may be applied to a color image forming apparatus having a plurality of process cartridges.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-147663 filed Jul. 31, 2017, which is hereby incorporated by reference herein in its entirety.

What is claimed is:

1. A sheet conveying apparatus comprising:
    a storage portion configured to store a sheet;
    a rotating member configured to come into contact with the sheet and convey the sheet in a sheet conveying direction by rotating; and
    a drive transmission unit including a first gear provided with a first engaging portion, a second gear provided with a second engaging portion configured to engage with the first engaging portion, and an urging member having an urging direction and configured to urge the first gear toward the second gear, wherein the drive transmission unit is configured to transmit driving force from a driving source to the rotating member when the first gear and the second gear are configured to rotate in a first direction,
    wherein, in a state where the first engaging portion and the second engaging portion are engaged with each other and the first gear is rotating in the first direction, a first surface of the first engaging portion transmits the driving force from the first gear to the second gear,
    wherein the storage portion includes an inclined surface configured to come into contact with the sheet being conveyed in the sheet conveying direction and perform sheet separation,
    wherein the inclined surface is provided on a downstream side of the rotating member with respect to the sheet conveying direction,
    wherein the first surface is inclined such that the first engaging portion is retracted from the second engaging portion in a direction against an urging force of the urging member while the first engaging portion rotates in the first direction, and
    wherein the first gear is a helical gear that includes helical teeth having a direction of twist, and the direction of twist of the helical teeth in the first gear is a direction configured to generate an axial force with respect to the urging direction of the urging member.

2. The sheet conveying apparatus according to claim 1, wherein a second surface of the first engaging portion, that contacts the second engaging portion in a case where the second gear rotates in the first direction in a state where the transmission of the driving force from the driving source is stopped, is inclined in such a direction that the first engaging portion or the second engaging portion can retract, in the direction against the urging force of the urging member, to release the engagement with the other of the engaging portions while the second gear rotates in the first direction.

3. The sheet conveying apparatus according to claim 1, further comprising a holding member configured to hold the rotating member,
    wherein the rotating member is in contact with a surface of the sheet stored in the storage portion by pivoting the holding member with respect to a gravitational direction, which is orthogonal to the sheet conveying direction, and
    wherein a pivot shaft of the holding member is disposed on an upstream side of the rotating member with respect to the sheet conveying direction.

4. The sheet conveying apparatus according to claim 1, wherein, in a state where the first engaging portion and the second engaging portion are engaged with each other, the first gear transmits the driving force from the driving source to the second gear.

5. An image forming apparatus comprising:
    an image forming unit configured to form an image on a sheet;
    a storage portion configured to store a sheet;
    a rotating member configured to come into contact with the sheet and convey the sheet in a sheet conveying direction by rotating; and
    a drive transmission unit including a first gear provided with a first engaging portion, a second gear provided with a second engaging portion configured to engage with the first engaging portion, and an urging member having an urging direction and configured to urge the first gear toward the second gear, wherein the drive transmission unit is configured to transmit driving force from a driving source to the rotating member when the first gear and the second gear are configured to rotate in a first direction, wherein, in a state where the first engaging portion and the second engaging portion are engaged with each other and the first gear is rotating in the first direction, a first surface of the first engaging portion transmits the driving force from the first gear to the second gear, wherein the storage portion includes an inclined surface configured to come into contact with the sheet being conveyed in the sheet conveying direction and perform sheet separation, wherein the inclined surface is provided on a downstream side of the rotating member with respect to the sheet conveying direction, wherein the first surface is inclined such that the first engaging portion is retracted from the second engaging portion in a direction against an urging force of the urging member while the first engaging portion rotates in the first direction, and wherein the first gear is a helical gear that includes helical teeth having a direction of twist, and the direction of twist of the helical teeth in the first gear is a direction configured to generate an axial force with respect to the urging direction of the urging member.

6. A sheet conveying apparatus comprising:
a storage portion configured to store a sheet;
a rotating member configured to come into contact with the sheet and convey the sheet in a sheet conveying direction by rotating; and
a drive transmission unit including a first gear provided with a first engaging portion, a second gear provided with a second engaging portion configured to engage with the first engaging portion, and an urging member having an urging direction and configured to cause the first gear and the second gear to be urged toward each other, wherein the drive transmission unit is configured to transmit driving force from a driving source to the rotating member when the first gear and the second gear are configured to rotate in a first direction, wherein, in a state where the first engaging portion and the second engaging portion are engaged with each other and the first gear is rotating in the first direction, a first surface of the first engaging portion transmits the driving force from the first gear to the second gear, wherein the first surface is inclined in such a direction that the first engaging portion or the second engaging portion can retract, in a direction against the urging force of the urging member, to release the engagement with the other of the engaging portions while the first engaging portion rotates in the first direction, wherein, the engagement between the first engaging portion and the second engaging portion is released before torque applied to the first engaging portion and the second engaging portion due to the driving force from the driving source exceeds an allowable torque deforming or breaking the first gear or the second gear, and wherein the following Expression 1 is satisfied:

$$T1 > (R \cdot F(\sin \theta1 + \mu \cos \theta1)/(\cos \theta1 - \mu \sin \theta1)) \quad \text{(Expression 1)},$$

where R is a length of a perpendicular drawn from the first surface toward an axis line of the first gear, $\theta1$ is an inclination angle of the first surface, $\mu$ is a friction coefficient of the first engaging portion and the second engaging portion, F is the urging force of the urging member, and T1 is the allowable torque in a state where the first gear and the second gear rotate in the first direction.

7. The sheet conveying apparatus according to claim 6, wherein a second surface of the first engaging portion, that contacts the second engaging portion in a case where the second gear rotates in the first direction in a state where the transmission of the driving force from the driving source is stopped, is inclined in such a direction that the first engaging portion or the second engaging portion can retract, in the direction against the urging force of the urging member, to release the engagement with the other of the engaging portions while the second gear rotates in the first direction.

8. The sheet conveying apparatus according to claim 7, wherein the following Expression 2 is satisfied:

$$T2 > (R \cdot F(\sin \theta2 + \mu \cos \theta2)/(\cos \theta2 - \mu \sin \theta2)) \quad \text{(Expression 2)}$$

where R is a length of a perpendicular drawn from the first surface toward an axis line of the first gear, $\theta2$ is an inclination angle of the second surface, $\mu$ is a friction coefficient of the first engaging portion and the second engaging portion, F is the urging force of the urging member, and T2 is the allowable torque when the second gear rotates in the first direction in a state where the transmission of the driving force from the driving source is stopped.

9. The sheet conveying apparatus according to claim 6, wherein the storage portion includes an inclined surface configured to come into contact with the sheet being conveyed in the sheet conveying direction and perform sheet separation, wherein the rotating member is contactable with the sheet stored in the storage portion, and wherein the inclined surface is provided on a downstream side of the rotating member with respect to the sheet conveying direction.

10. The sheet conveying apparatus according to claim 6, further comprising:
a holding member configured to hold the rotating member,
wherein the rotating member is in contact with a surface of the sheet stored in the storage portion by pivoting the holding member with respect to a gravitational direction, which is orthogonal to the sheet conveying direction, and
wherein a pivot shaft of the holding member is disposed on an upstream side of the rotating member with respect to the sheet conveying direction.

11. The sheet conveying apparatus according to claim 6, wherein, in a state where the first engaging portion and the second engaging portion are engaged with each other, the urging member urges the first gear toward the second gear and the first gear transmits the driving force from the driving source to the second gear.

12. The sheet conveying apparatus according to claim 11, wherein the first gear is a helical gear that includes helical teeth having a direction of twist, and the direction of twist of the helical teeth in the first gear is a direction configured to generate an axial force with respect to the urging direction of the urging member.

13. An image forming apparatus comprising:
the sheet conveying apparatus according to claim 6; and
an image forming unit configured to form an image on a sheet conveyed by the rotating member of the sheet conveying apparatus.

* * * * *